No. 851,418. PATENTED APR. 23, 1907.
R. HERMAN.
MOTOR VEHICLE.
APPLICATION FILED JUNE 6, 1906.
2 SHEETS—SHEET 1.
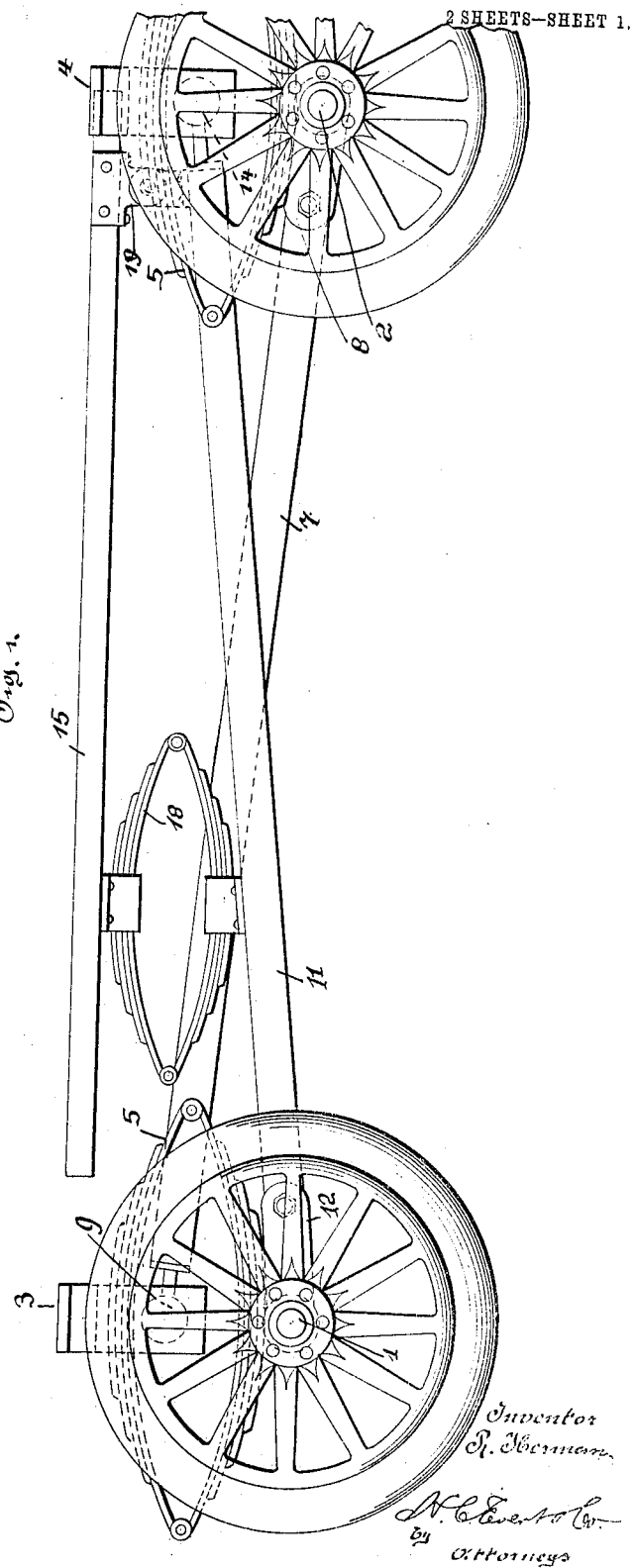

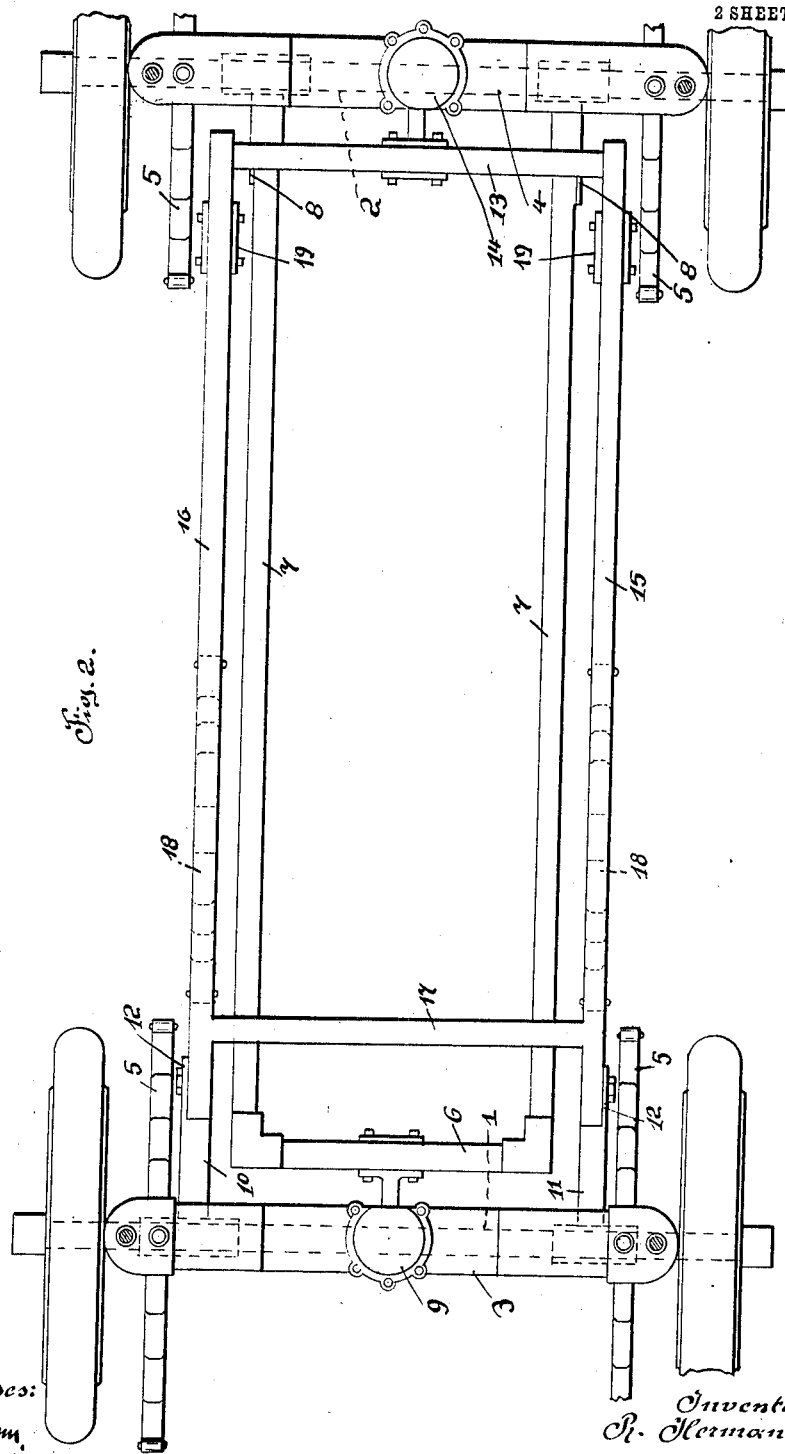

UNITED STATES PATENT OFFICE.

REINHOLD HERMAN, OF CRAFTON, PENNSYLVANIA.

MOTOR-VEHICLE.

No. 851,418.      Specification of Letters Patent.      Patented April 23, 1907.

Application filed June 6, 1906. Serial No. 320,430.

*To all whom it may concern:*

Be it known that I, REINHOLD HERMAN, a citizen of the United States of America, residing at Crafton, in the county of Allegheny and State of Pennsylvania, have invented certain new and useful Improvements in Motor-Vehicles, of which the following is a specification, reference being had therein to the accompanying drawings.

This invention relates to motor vehicles of the four wheel type, and its primary object is to provide a novel construction and arrangement of suspended frames or chassis whereby jolts and jars to occupants of the vehicle and strain upon the vehicle itself will be reduced to the minimum, thus materially contributing to the comfort of users of these machines and adding to the strength and durability of the vehicle.

In constructing my improved motor vehicle, I employ an outer and an inner suspended frame and a supplemental upper suspended frame for supporting the vehicle body, each of said frames having an independent spring support to adapt it to yield independently in passing uneven places or obstructions in the road.

The construction of the improvement will be fully described hereinafter in connection with its accompanying drawings, which form part of this specification, and its novel features will be defined in the appended claims.

In the drawing, Figure 1 is a side elevation of a motor vehicle frame constructed in accordance with my invention, and Fig. 2 is a top plan view of the same.

The reference numerals 1 and 2, respectively designate the front and rear axles of the vehicle, and 3 and 4 the front and rear bolsters supported above the axles upon elliptical springs 5.

The inner frame comprises a front cross bar 6 and parallel side bars 7, the rear ends of the latter being secured to the rear axle 2 by suitable supporting and connecting shoes 8. The cross bar 6 is connected to the front bolster 3 by a universal connection preferably a ball and socket joint 9. This inner frame serves as the support for the motor and accessories (not shown).

The outer frame consists of parallel side bars 10 and 11 secured to the front axle 1 by shoes 12, and a cross bar 13 connecting the rear ends of the bars 10 and 11 and having a ball and socket connection 14 to the rear bolster.

Above the outer frame bars 10 and 11 is arranged an upper supplemental suspended frame, the parallel side bars 15 and 16 of which are connected adjacent to their front ends by a cross bar 17 and supported upon elliptical springs 18 interposed between the bars 15 and 16 and the side bars 10 and 11 of the outer frame. The bars 15 and 16 are connected at their rear ends by hinge connections with supports 19 projecting from the bars 10 and 11. This upper suspended frame or chassis carries the vehicle body, and hence any shocks or jars caused by unevenness of the road or obstructions thereon will be borne by the inner and outer frames without materially affecting the upper supplemental suspended frame, and the vehicle body.

It will be apparent that each of the three frames constituting the supporting structure of the vehicle is adapted to yield independently of the others, each having an independent spring support, and the inner and outer frames each having an independent connection with the axles and bolsters.

The invention is not restricted to any specific means for securing the ends of the inner and outer frames to the axles, or the side bars of the upper suspended frame to the outer frame, as any means for this purpose may be employed which will permit the frames to have the required vertical play or yielding motion; and also any securing means desired may be used to connect the cross bars of the inner and outer frames to the front and rear bolsters, that will allow the required movement of the axle without undue vibration of the frames. I therefore would have it understood that I reserve the right to make all such modifications and variations in the minor details of construction, as may fall within the scope of the claims.

What I claim and desire to secure by Letters Patent, is:—

1. A frame structure for motor vehicles, comprising an inner suspended frame, an outer suspended frame, and a supplemental upper suspended frame each of said frames having an independent connection with the vehicle and an independent yielding support.

2. The combination with the axles and bolsters of a motor vehicle, of an outer frame secured to the forward axle, and the rear bolster, an inner frame secured to the rear axle, and the front bolster; and a supplemental upper frame suspended above said outer frame, and adapted to support the vehicle body.

3. In a motor vehicle, a frame structure comprising an inner frame and an outer frame, each of said frames having an independent connection with the vehicle, and a supplemental frame yieldingly supported above said outer frame.

4. In a motor vehicle, the combination with an inner and an outer suspended frame, of means for securing said frames to the axles of the vehicle, means for connecting said frames to the vehicle bolsters, a supplemental frame supported above said outer frame, and spring supports for each of said frames.

5. In a motor vehicle, the combination with an outer frame connected to the front axle, and having a universal connection with the rear bolster, of an inner frame connected to the rear axle, and having a universal connection with the front bolster, and a supplemental upper frame yieldingly connected at its rear end, and yieldingly supported at its forward end upon said outer frame.

6. In a motor vehicle, a frame structure comprising two suspended frames, each having an independent fixed support, and a yielding support, and a supplemental suspended frame having a pivotal support at its rear end, and a yielding support at its forward end.

7. In a motor vehicle, the combination with the axles and bolsters, of an inner and an outer frame, each comprising parallel side bars, connected together by a cross bar, the disconnected ends of the side bars of one of said frames being secured to one of said axles, and the disconnected ends of the side bars of the other of said frames being connected to the other axle, means for yieldingly connecting the cross bars of said frames to said bolsters, and a supplemental upper frame yieldingly supported upon one of said first-named frames.

In testimony whereof I affix my signature in the presence of two witnesses:

REINHOLD HERMAN.

Witnesses:
MAX H. SROLOVITZ,
F. O. MCCLEARY.